July 4, 1961  S. GUARNASCHELLI  2,991,093
HOSE WITH SELF GASKETING FEATURE
Filed Feb. 25, 1959  2 Sheets-Sheet 1

INVENTOR.
STEPHEN GUARNASCHELLI

July 4, 1961  S. GUARNASCHELLI  2,991,093
HOSE WITH SELF GASKETING FEATURE

Filed Feb. 25, 1959  2 Sheets-Sheet 2

INVENTOR.
STEPHEN GUARNASCHELLI

United States Patent Office 2,991,093
Patented July 4, 1961

2,991,093
HOSE WITH SELF GASKETING FEATURE
Stephen Guarnaschelli, Garden City Park, N.Y., assignor to Titeflex, Inc., Springfield, Mass., a corporation of Massachusetts
Filed Feb. 25, 1959, Ser. No. 795,515
5 Claims. (Cl. 285—110)

This invention relates to improvements in hose fittings and more especially to reusable fittings for hose materials that are of a resilient nature down to and including materials which are soft or of a low durometer. The invention relates more particularly to a hose fitting that bulges the end portion of the hose to provide a bead which serves as a gasket, and also to such fittings with means for clamping the end portion of a braid surrounding and reinforcing the hose.

It is an object of the invention to provide an improved hose fitting which shapes the end of the hose so that the end of the hose itself serves as a gasket for preventing leakage where the hose comes against the fitting.

Another object of the invention is to provide a hose fitting, of the character indicated, with means for retaining the hose in the fitting during the shaping of the end of the hose to form a gasket section.

It is another object of the invention to provide an improved fitting for braided hose with means for securing the braid to one portion of the fitting and with means for bulging the end of the hose to form a bead as the parts of the fitting are assembled with the hose. The construction has the advantage that it can be used with hoses having plain ends, and without any auxiliary parts aside from the parts of the fitting itself.

It is still another object of the invention to provide a hose fitting with a retainer ring that serves the function of clamping the braid of the hose while at the same time engaging the surface of the hose itself to retain it in the fitting while another part of the fitting is brought into contact with the end of the hose to deform the end into a bead which serves as a gasket in the fitting.

Other features of the invention relate to the construction of the braid-clamping element to provide a positive stop against axial displacement in one direction, and to the clamping of a bead of the hose against at least one of the braid-retaining elements so that the hose cannot possibly blow off the fitting unless the material of the hose fails in tension.

The invention includes a shoulder of special shape combined with a nipple or inner sleeve so that deforming of the hose is confined to an outward displacement; and combined with confining surfaces that cause the deformed material of the hose to shape itself into a bead that seals the fitting when the parts are in their final assembled relation with one another.

Other objects, features and advantages of the invention will appear or be pointed out as the description proceeds.

In the drawing, forming a part hereof, in which like reference characters indicate corresponding parts in all the views.

Figure 1:
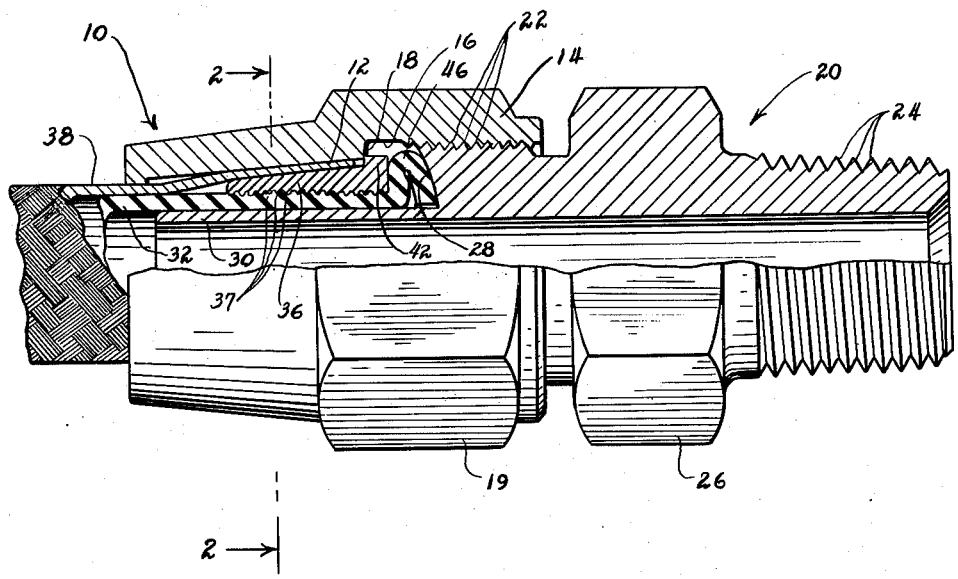
FIGURE 1 is an assembly view, partly in section, showing a fitting of this invention connected with a hose.
Figure 2:
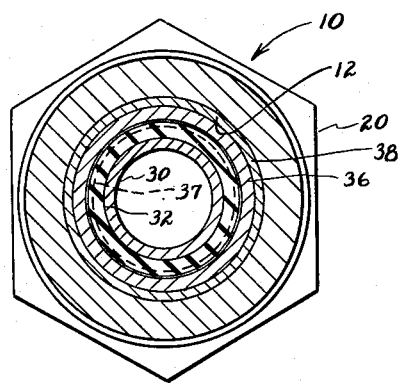
FIGURE 2 is a sectional view taken on the line 2—2 of FIGURE 1.

The fitting has outer fitting means that include an outer member or sleeve 10 having a tapered inside wall 12 at one end and a threaded section 14 at the other end. There is an annular groove 16 between the tapered portion 12 and the threaded section 14. At one end of this annular groove 16 there is an annular end wall 18. The outside of the sleeve 10 has a polygonal surface 19 for holding the sleeve with a wrench.

The fitting includes also an inner fitting member 20 with threads 22 at one end engaging the threaded portions 14 of the sleeve 10. The inner member 20 has other threads 24 for connecting it with a pipe fitting or other part with which the hose fitting of this invention is to be used. Between the threads 22 and 24 there is a polygonal section 26 for gripping the inner member with a wrench.

A seat or shoulder 28 is located on the inner fitting member 20 beyond the threads 22; and a nipple or inner sleeve 30 extends from the shoulder 28 into a hose 32 to which the fitting is connected. This inner sleeve 30 fits into the hose with a rather tight fit and is advanced further into the hose as the threads 22 are screwed into the threaded section 14 of the sleeve 10. The annular surface provided by the shoulder 28 is generally frusto-conical and slopes toward the hose 32 as the surface extends radially outwardly away from the inner sleeve 30.

The outer fitting means include also a locking portion having a retainer ring 36 surrounding the hose 32 and having threads 37 on its inside surface for engaging the surface of the hose 32. This retainer ring 36 is of rather limited radial extent so that at least a portion of it can fit between the hose 32 and a braid 38 which surrounds and reinforces the hose. The outside surface of the retainer ring 36 has a taper similar to that of the inside surface of the sleeve 10, and the braid 38 is clamped between these tapered surfaces of the sleeve 10 and retainer ring 36.

At its larger end, the retainer ring 36 has a peripheral portion 42 which engages behind the annular wall 18 to lock the retainer ring 36 against axial displacement in at least one direction with respect to the sleeve 10. With the threads of the retainer ring 36 engaged in the outside surface of the hose 32, the hose is also locked against movement by the engagement of the peripheral portion 42 of the retainer ring with the annular wall 18. The inner sleeve 30 clamps the hose 32 firmly against the threads on the retainer ring 36 so as to cause these threads to engage securely in the outside surface of the hose.

The end of the hose 32 is bulged outwardly and folded back on itself to form a bead 46 which is firmly clamped between the generally frusto-conical surface of the shoulder 28 and the end face of the retainer ring 36.

When the fitting is to be initially assembled with the hose, the sleeve 10 is first placed over the outside of the braid and pushed along the braid to a location substantially beyond the position which it will occupy in the complete assembly. The retainer ring 36 is then threaded over the end of the hose and under the braid 38 which has been cut back for a substantial distance inward from the actual end of the hose 32.

The outer sleeve 10 is then moved into position to clamp the braid 38 against the retainer ring 36, but this initial movement of the sleeve 10 into clamping position is done by hand and therefore exerts no substantial pressure against the braid. The parts are designed so that the peripheral portion 42 of the retainer ring 36 does not come into contact with the annular wall 18 when the sleeve 10 is brought into this initial clamping position.

The inner fitting member 20 is then brought into position to insert the nipple or inner sleeve 30 into the end of the hose, the hose being still cylindrical. The inner sleeve 30 is advanced into the hose until the threads 22 on the inner fitting 20 come into position to screw into the threaded sections 14 of the sleeve 10. The inner fitting 20 is then rotated to screw it along the threads of the section 14 of the outer sleeve; and as the shoulder 28 advances axially with the inner fitting 20, the frusto-conical surface of the shoulder 28 comes against the hose 32 and compresses the hose axially.

As this pressure increases, the hose 32 and retainer ring 36 move axially to a limited extent with respect to the sleeve 10. The retainer ring 36, with its threads engaged with the outside surface of the hose 32, moves as a unit with the hose and within the tapered end of the sleeve 10 with the result that the braid 38 is tightly clamped between the tapered surfaces of the sleeve 10 and the retainer ring 36. This movement stops when the peripheral portion 42 of the retainer ring 36 comes against the annular wall 18, and further movement of the frusto-conical surface 28 toward the retainer ring 36 causes the end portion of the hose 32 to be distorted and bulged outwardly to form the bead 36.

The outer edge of the end face of the hose 32 slides inwardly along the sloping face of the shoulder 28 and thereby causes the end of the hose to fold inwardly into the position shown in FIGURE 1, or some similar position which may be closer to the surface of the inner sleeve 30. The particular shape of the bead 46 depends upon the thickness of the wall of the hose and upon the relative stiffness of the material of which the hose is made. In any event, the end is folded over to form an outwardly extending bead, because the inner sleeve 30 prevents the hose from folding inwardly in response to the original axial pressure exerted against it while in cylindrical form. The bead 46 is compressed and forms, in effect, a gasket for preventing leakage at the end of the hose.

The forming of the bead 46 and its compression between the retainer ring 36 and the shoulder 28, with the retainer ring locked against movement away from the shoulder 28, results in a mechanical lock between the hose and the fitting, and the hose cannot blow off the fitting unless the material of the hose fails in tension.

Figure 3:
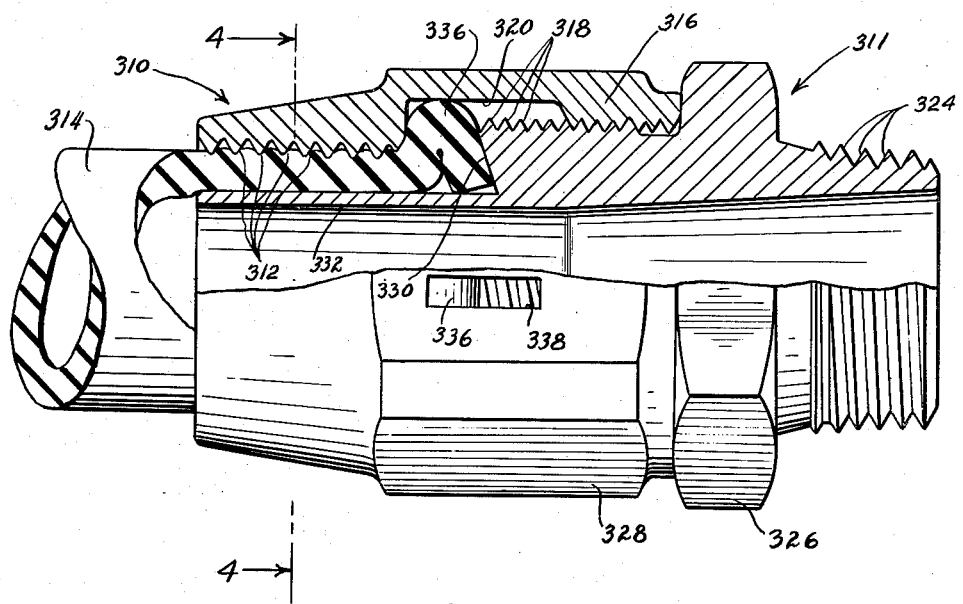
FIGURE 3 is a view similar to FIGURE 1 but showing a modification of the invention for use with hose that has no braid.
Figure 4:
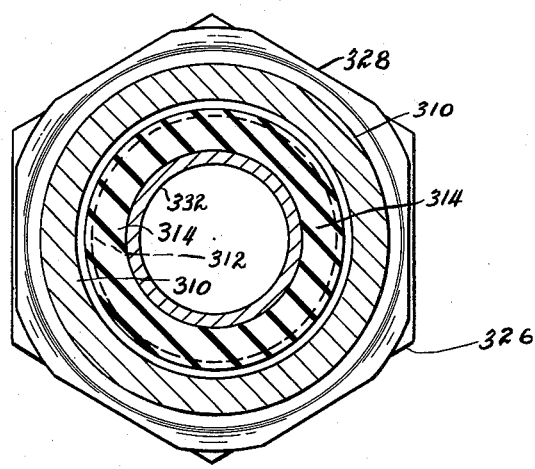
FIGURE 4 is a sectional view taken on the line 4—4 of FIGURE 3.

In the construction shown in FIGURE 3, the fitting is made with an outer fitting or sleeve 310 and an inner fitting member 311. There are inside threads 312 at one end of the sleeve, and these threads 312 engage the outside surface of a hose 314. The threads are preferably tapered so that the inside diameter of the threaded portion of the sleeve becomes progressively smaller toward the right in FIGURE 3. The purpose of the threads 312 is to grip the hose 314 securely so that the hose cannot move axially with respect to the fitting while the fitting is being pulled together to form a bead on the end portion of the hose. The threads 312 are preferably made dull so as not to cut or tear the hose 314.

There is a threaded section 316 at the other end of the sleeve 310 with inside threads that fit outside threads 318 on the inner fitting member 311. The threaded end portions of the sleeve 310 have an annular groove 320 between them.

The inner fitting member 311 has other threads 324 for connecting the fitting assembly with a pipe or any other device with which the hose 314 is to be used. A polygonal section 326, between the threads 318 and 324 of the inner fitting member, provides surfaces by which the fitting member 311 can be gripped with a wrench. A corresponding polygonal section of the sleeve 310 is indicated by the reference character 328.

Beyond the threads 318, the inner fitting member 311 has a seat or shoulder 330 which is a frusto-conical surface sloping toward the hose as the surface extends radially outwardly. A nipple or inner sleeve 332 extends from the shoulder 330 into the hose 314. This inner sleeve 332 is preferably of one-piece construction with the inner fitting member 311.

When the fitting is assembled with the hose 314, the end portion of the hose has a bulge or bead 336 confined longitudinally between the shoulder 330 and a confronting end wall of the annular groove 330, and is confined radially between the inside surface of the annular groove 320, and the outside surface of the inner sleeve 332. This confinement of the bulge or bead 336 permits it to be clamped tightly so that it serves as a gasket under substantial pressure for preventing leakage of high pressure fluid from the hose; but it also serves another equally important function in that it provides a mechanical axial lock for the hose in the fitting so that the hose material has to fail in tension in order for the hose to blow off the fitting.

The hose 314 is originally cylindrical with a conventional straight cut across its end, and the fitting members 310 and 311 are separate from one another when the hose is originally inserted into the outer fitting 310. In connecting the fitting with the hose, the outer fitting member or sleeve 310 is first screwed over the outside of the hose far enough to leave the end of the hose projecting entirely across the annular groove. An opening or window 338 through the sleeve 310 permits the operator to determine by inspection when the bulge or bead 336 has assumed a position which permits it to function as a gasket between the opposed radial surfaces of the inner and outer sleeve.

The inner fitting member 311 is then inserted into the sleeve 310 from the right in FIGURE 3; and the nipple or inner sleeve 332 is pushed into the inside of the hose 314. The inner fitting member 311 is then advanced axially toward the left in FIGURE 3 until the threads 318 engage the threaded section 316 of the outer sleeve 310. The inner fitting member 311 is then rotated to screw it into the threaded section 316 and this brings the shoulder 330 into contact with the end face of the hose 314.

Continued axial movement of the inner fitting member 311 compresses the end portion of the hose 314 which is located adjacent to the groove 320. This compressing of the hose causes it to bulge. Since the inner sleeve 311 prevents the hose from bulging inwardly, the end pressure causes an outward bulging of the hose 314 until the outside surface of the hose strikes against the circumferential wall of the annular groove 320. As the end portion of the hose bulges outwardly to form the bead 336, the outer edge of the end face of the hose slides inwardly along the frusto-conical surface of the shoulder 330, and preferably until the end face of the hose strikes against the outside surface of the inner sleeve 332, as shown in FIGURE 3.

During this compressing and deforming of the end portion of the hose 314 to form the bead 336, the threads 312 on the sleeve 310 prevent the hose from being pushed out of the fitting, and the inner sleeve 332 clamps the hose against the threads 312 to maintain the grip necessary for retention of the hose in the sleeve 310.

In the illustrated construction, the inner sleeve 332 is cylindrical, but its outside diameter is a relatively tight fit in the hose and the axial advancement of the inner sleeve 332 in the hose 314, during assembly of the hose end fitting, is facilitated as a result of the rotation of the inner sleeve 332 with the inner fitting member 311.

This application is a continuation-in-part of my abandoned application, Serial No. 615,407, filed October 11, 1956, and includes also the subject matter of my application, Serial No. 615,408, filed October 11, 1956, and later abandoned.

The preferred construction of the invention has been illustrated and described, but changes and modifications can be made and some features can be used in different combinations without departing from the invention as defined in the claims.

What is claimed is:

1. A hose fitting assembly comprising a hose having a wall made of resilient material of a substantial wall thickness, outer fitting means having a locking portion with a threaded and axially-extending passage that screws over the outside surface of the resilient hose wall, the hose having an end portion of a length at least six times as great as the thickness of said resilient hose wall when uncompressed and that extends beyond the threaded passage, a nipple that extends into the part of the hose which is located in the threaded passage, the nipple having a smooth external surface throughout in contact with the inside surface of the resilient hose wall and the nipple having an outside diameter less than the diameter of the threaded passage but with the difference in diameter less than the undisturbed thickness of the resilient hose wall whereby the nipple holds the resilient hose wall engaged with the threads of said passage and locked against axial sliding movement in the threaded passage, an end element secured to the nipple and forming a shoulder at an angle not exceeding a right angle with said nipple and that abuts the end of the hose, said shoulder being at a distance from the end of the nipple substantially less than the total length of hose that projects beyond the threaded opening, and said shoulder being spaced from a confronting end face of the locking portion of the outer fitting means, said shoulder and said outer fitting means, including said end face, forming a chamber with said nipple having a radial depth at least three times the radial thickness of said resilient hose wall, the end portion of the hose wall as it extends from the threaded opening curving outwardly and out of contact with the nipple before reaching the shoulder and radially across the front of said locking portion, then forwardly toward the end element and then folding back radially inward in contact with the shoulder forming a flexible gasket end on the hose wall, the outer fitting means having also connecting portions including other threads that hold the locking portion and the shoulder in assembled relation and with the folded end of the hose clamped between them.

2. The hose fitting assembly described in claim 1, and in which the shoulder has an axial slope with the radially outward portions of the shoulder closer to the confronting face of the locking portion.

3. The hose fitting assembly described in claim 1, and in which the hose has an outer braid, and the locking portion of the outer fitting means has a tapered outside surface in contact with the inside surface of the braid, and said outer fitting means includes a face that clamps the braid tightly against the tapered surface and that is held in clamping relation to the braid by the same threads that hold the outer fitting means in assembled relation with the shoulder that abuts the end of the hose.

4. The hose fitting assembly described in claim 1, and in which the outer fitting means is a sleeve of different inside diameter along different portions of its length, the smaller diameter portion of said sleeve being the threaded passage that screws over the outside surface of the hose, and the larger diameter portion of the sleeve having threads therein which constitute the other threads that hold the locking portion and the shoulder in assembled relation and with the folded end of the hose clamped between them.

5. The hose fitting assembly described in claim 4, and in which the sleeve has an intermediate portion of its length, between the threads of the locking portion and said other threads, where the inside diameter of the sleeve is larger than it is at any of said threads, said intermediate portion providing a circumferential groove for receiving the periphery of the folded-over end of the hose.

References Cited in the file of this patent

UNITED STATES PATENTS

| 1,271,597 | Mazade | July 9, 1918 |
| 2,490,686 | Guarnaschelli | Dec. 6, 1949 |

FOREIGN PATENTS

| 762,732 | France | Jan. 29, 1934 |
| 1,045,504 | France | June 24, 1953 |